United States Patent [19]

Brady

[11] 4,010,137

[45] Mar. 1, 1977

[54] PHOSPHORUS-CONTAINING FLAME RETARDANT FOR SYNTHETIC RESINS

[75] Inventor: Donnie G. Brady, Bartlesville, Okla.

[73] Assignee: Phillips Petroleum Company, Bartlesville, Okla.

[22] Filed: Dec. 15, 1975

[21] Appl. No.: 641,042

Related U.S. Application Data

[63] Continuation-in-part of Ser. No. 382,169, July 24, 1973, Pat. No. 3,936,416.

[52] U.S. Cl. .................. 260/45.8 NT; 260/248 R; 260/606.5 P; 252/8.1
[51] Int. Cl.² ........................................ C08K 5/52
[58] Field of Search ........ 260/45.8 NT, 248, 606.5; 252/8.1

[56] References Cited

UNITED STATES PATENTS

| | | | |
|---|---|---|---|
| 2,470,042 | 5/1949 | McLean | 117/137 |
| 2,583,549 | 1/1952 | Daul et al. | 117/137 |
| 3,284,216 | 11/1966 | Kaplan | 106/16 |
| 3,654,190 | 4/1972 | Levine | 260/45.9 NP |
| 3,810,862 | 5/1974 | Mathis et al. | 260/45.9 NP |
| 3,819,575 | 6/1974 | Green | 260/45.7 R |
| 3,839,239 | 10/1974 | Godfried | 252/8.i |
| 3,839,276 | 10/1974 | Rohlfs et al. | 260/45.9 NP |
| 3,936,416 | 2/1976 | Brady | 260/45.9 NP |

OTHER PUBLICATIONS

Industrial & Engineering Chemistry, vol. 40, 1948, pp. 1464–1467.
Encyclopedia of Polymer Science and Technology, vol. 7, copyright 1967, pp. 36–38.

*Primary Examiner*—V. P. Hoke

[57] ABSTRACT

A phosphorus-containing flame retardant for synthetic resins is produced when suitable amounts of a phosphorus oxide compound of the formula $(P_2O_5)_{0.5-1.0}(H_2O)_{0.0-1.5}$, melamine, and at least one saturated open-chain polyol containing from 5 to 15 carbon atoms and from 4 to 8 hydroxyl groups are combined and heated under such conditions that the resulting product when incorporated into a synthetic resin will not cause significant foaming of the synthetic resin composition when it is subjected to molding conditions but will still impart flame resistance to said synthetic resin.

50 Claims, No Drawings

PHOSPHORUS-CONTAINING FLAME RETARDANT FOR SYNTHETIC RESINS

This is a continuation-in-part of application Ser. No. 382,169, filed July 24, 1973, now U.S. Pat. No. 3,936,416 issued Feb 3, 1976. That parent application discloses a flame-retardant additive based on ammonium polyphosphate and dipentaderythritol as well as other phosphorus-containing flame-retardant additives. Due to a restriction requirement only the flame retardant based on ammonium polyphosphate and dipentaerythritol was considered in the parent application. The present application includes within its scope the other phosphorus-containing flame-retardant additives disclosed in application Ser. No. 382,169.

This invention relates to flame retardants. In one aspect this invention relates to phosphorus-containing flame retardants. This invention also relates to a method of preparing such flame retardants. It further relates to synthetic resin compositions rendered flame-retardant by the inventive phosphorus-containing flame retardants.

Also the invention relates to a flame retardant or nonburning, nondripping, char-forming polypropylene composition. It also relates to a method of preparing such compositions. In one of its aspects the invention relates to the modification of additive systems prior to compounding the same with polypropylene to avoid void formation or foaming during molding operations.

In one of its concepts the invention provides a flame retardant or nonburning, nondripping, char-forming polypropylene composition containing polypropylene and a minor amount of at least one of the following additive systems:

1. Melamine pyrophosphate and at least one of pentaerythritol, dipentaerythritol, and tripentaerythritol;
2. Reaction product of phosphoric acid, urea, melamine, and at least one of pentaerythritol, dipentaerythritol, and tripentaerythritol; and
3. Reaction product of phosphoric acid, phosphorus pentoxide, melamine, and at least one of pentaerythritol, dipentaerythritol, and tripentaerythritol.

In a further concept, the invention provides a polypropylene composition containing an additive rendering it fire retardant or nonburning, nondripping and char-forming which will be substantially non-void forming during molding operations due to gas formation.

In another concept, the pH of a water slurry of the additive is adjusted prior to washing, drying and degassing of the flameretardant additive.

The production of resin compositions which are flame-retardant is of considerable commercial importance in that articles such as castings, moldings, laminated articles, etc., are often required, or at least desired, to be flame-resistant. I have now discovered certain specific additive compositions which can be incorporated into polyolefins such as polypropylene, or other synthetic resins, as herein described in more detail, to render the same fire retardant or nonburning, nondripping, and char-forming. Such polypropylene compositions are finding increasing usefulness as the use of polypropylene is expanded.

Thus, I have discovered that an increase in molding temperatures can be accomplished without undesirable void formation if the additive composites are degassed prior to formulation with polypropylene or other synthetic resins.

It is an object of this invention to provide specific phosphorus-containing additives which impart flame resistance to synthetic resins when compounded into said resins.

A further object is to provide specific phosphorus-containing flame-retardant additives which have less tendency to cause void formation in the synthetic resins containing them when said synthetic resins containing said additives are subjected to molding conditions.

It is also an object of this invention to provide a fire retardant or nonburning, nondripping, char-forming synthetic resin composition. It is another object of this invention to provide the various specific flame-retardant additives for incorporation into polypropylene to render the same fire-retardant or nonburning, nondripping and char-forming. It is a further object of this invention to so treat said additives prior to their incorporation into polypropylene to render the same fire-retardant or nonburning, nondripping and char-forming that when the polypropylene is thus composited therewith and used in a molding operation in which void formation is undesirable, void formation will have been substantially completely eliminated or at least very substantially reduced. In a still further object of the invention there is produced a polypropylene composition as herein described which can be molded at temperatures substantially higher than heretofore, the composition containing a specially modified fire-retarding, char-forming additive.

Another object is to provide a flame-retardant composition of better color, better thermal stability and relatively low void formation.

Other aspects, concepts, objects and several advantages of the invention are apparent from a study of this disclosure and the appended claims.

According to the present invention a phosphorus-containing flame retardant is produced when suitable amounts of at least one phosphorus oxide compound of the formula $(P_2O_5)_{0.5-1.0}(H_2O)_{0.0-1.5}$, melamine, and at least one saturated open-chain polyol containing from 5 to 15 carbon atoms and from 4 to 8 hydroxyl groups are combined and heated under such conditions that the resulting product when incorporated into a synthetic resin will not cause significant foaming of the synthetic resin composition when the synthetic resin composition is subjected to molding conditions, but will still impart flame resistance to said synthetic resin.

Phosphorus oxide compounds of the formula $(P_2O_5)_{0.5-1.0}(H_2O)_{0.0-1.5}$ include, for example, phosphorus pentoxide, orthophosphoric acid, and condensed phosphoric acids. A condensed phosphoric acid is a phosphoric acid containing any quantity of one or more polyphosphoric acids and/or metaphosphoric acids and any such acid can be employed in this invention. The polyphosphoric acids include the dimeric pyrophosphoric acid and other entities such as the trimer through the nonamer and even more highly condensed species. The properties of and compositions of the condensed phosphoric acids vary with the $P_2O_5$ content of the condensed phosphoric acid as discussed in Bell, "Composition of Strong Phosphoric Acids", Industrial and Engineering Chemistry, 40, 1464-1467 (1948). Although any condensed phosphoric acid is suitable for the present invention, generally a condensed phosphoric acid having from about 70 to about 100 weight percent $P_2O_5$ can be employed; or, more preferably, the condensed phosphoric acid employed contains about 80 to about 90 weight percent $P_2O_5$. Such condensed phosphoric acids may be prepared by any technique known by those skilled in this area.

The saturated open-chain polyols employed in this invention contain 5 to 15 carbon atoms and from 4 to 8 hydroxyl groups. Preferably, in addition to C, H, and hydroxyl groups the only other functional groups in the polyols are a maximum of two ether linkages per molecule. Examples of suitable polyols include, for example, sorbitol, mannitol, pentaerythritol, dipentaerythritol, and tripentaerythritol.

The phosphorus oxide as above-described, malamine, and polyol in accordance with this invention are employed in such amounts that after the combination is degassed as described the resulting additive will impart flame resistance to synthetic resin. The relative proportions of the ingredients which after being degassed will impart flame resistance to synthetic resins are considered to vary over a wide range. Generally, it is considered that flame retardance will be provided if each of the three-named ingredients are employed in amounts in the range of from about 1 to about 100 parts by weight.

Examples of synthetic resins that can be rendered flame-retardant with the phosphorus-containing additives of this invention include olefin homopolymers, olefin copolymers, acrylonitrile-butadiene-styrene resins, and polystyrene resins, and blends thereof. The inventive flame retardants are particularly well suited for normally solid molding grade resins.

Examples of normally solid polyolefins suitable for use in this invention include polymers of mono-alpha-olefins having the general formula $CH_2=CHR$ wherein R represents hydrogen or a hydrocarbyl radical, for example, an aryl radical or an alkyl radical or combinations thereof such as alkaryl and aralkyl, having up to a total of 10 carbon atoms in each R group. Typical polymers are the homopolymers and copolymers of ethylene, propylene, butene-1 isobutylene, pentene-1, styrene, and dimethylstyrene. Such polymers can be prepared by any suitable process known in the art which produces a normally solid polyolefin. When propylene copolymers are used, such as propylene/-ethylene copolymers, the ethylene comonomer is generally present in amounts ranging from about 2 to about 25 weight percent of said copolymer, and preferably the ethylene comonomer is present from about 5 to about 15 weight percent of said copolymer.

The degassed flame-retardant additive of this invention can be added without cooling directly to polypropylene or other synthetic resin and composited therewith or, if desired, can be cooled first. Or the additive system upon cooling at least to an extent can be later composited or compounded with the polypropylene in suitable proportions which for each condition of service can be determined by mere routine testing by one skilled in the art having possession of this disclosure and having studied same. The amount of the phosphorus-containing flame-retardant additive prepared according to this invention that is employed to obtain satisfactorily flame-resistant synthetic resin can vary widely, depending upon the resin, the additive components, and the desired degree of flame retardancy. In general, between about 20 and about 90 parts by weight of the phosphorus-containing flame retardant is employed for every 100 parts by weight of synthetic resin or, more preferably, about 30 to about 60 parts by weight of the phosphorus-containing flame retardant is employed for every 100 parts by weight of synthetic resin.

When a degassed phosphorus-containing additive of this invention is cooled prior to being incorporated in a synthetic resin it is desirable to pulverize the additive to produce a fine powder which will disperse well when mixed into a synthetic resin. Preferably the additive is employed in a powder which will pass through an 80-mesh sieve.

In one method of preparing a phosphorus-containing flame retardant of the instant invention, melamine pyrophosphate, the reaction product of malamine with pyrophosphoric acid, is used. Melamine pyrophosphate and at least one polyol selected from pentaerythritol, dipentaerythritol, and tripentaerythritol are combined in proportions that will impart flame retardance to a synthetic resin, and then the admixture is heated under such conditions that sufficient foaming occurs to insure that the flame retardant when subsequently incorporated into a synthetic resin will not cause significant foaming when the synthetic resin composition is subjected to molding conditions, but will impart flame resistance to the synthetic resin.

Generally it is sufficient in this method of preparation if the admixture of polyol and melamine pyrophosphate is heated at a temperature in the range of about 175° C to about 275° C until the foaming has substantially subsided. While any suitable ratio of melamine pyrophosphate to polyol effective to achieve the desired flame retardancy can be employed, in general the weight ratio of melamine pyrophosphate to polyol will be in the range of about 14:1 to about 0.25:1 to provide flame-resistance when the product is incorporated into a synthetic resin. A more preferable range for the weight ratio of melamine pyrophosphate to polyol is from about 4:1 to about 1:1.

The amount of the flame-retardant additive prepared in this manner that is employed in a synthetic resin composition in order to obtain a satisfactorily flame-resistant synthetic resin can vary widely, depending upon the resin, the additive components and the desired degree of flame retardancy. In general, about 30 to about 90 parts by weight of such flame-retardant additive is employed for every 100 parts by weight of the synthetic resin, or, more preferably, about 40 to about 60 parts by weight of the flame-retardant additive is employed for every 100 parts by weight of synthetic resin.

Another method for preparing a flame retardant according to the instant invention involves combining urea, phosphoric acid, melamine, and at least one polyol selected from pentaerythritol, dipentaerythritol, and tripentaerythritol in amounts that will impart flame retardance to a synthetic resin and heating under such conditions that sufficient foaming (degassing) occurs to insure that when an effective amount of the flame retardant is incorporated into a synthetic resin it will not cause significant foaming when the synthetic resin composition is subjected to molding conditions, but will impart flame resistance to said synthetic resin.

Although the reactants can be employed in any proportions that will impart flame resistance, generally there is employed from about 30 to about 100 parts by weight of orthophosphoric acid, about 40 to about 125 parts by weight of urea, about 3 to about 90 parts by weight of melamine, and about 5 to about 90 parts by weight of polyol. Within this general range the preferred amounts of reactants to be employed are about 60 to about 80 parts by weight orthophosphoric acid, about 75 to about 95 parts by weight urea, about 5 to about 70 parts by weight melamine, and about 10 to about 40 parts by weight polyol.

The reactants, viz., orthophosphoric acid, urea, polyol, and melamine can be simultaneously reacted. Alternatively, the orthophosphoric acid and the urea can be combined and then polyol added to provide a mixture which is heated until substantially all the esterification of the phosphoric acid has taken place, to yield a solid esterification product. This esterification product is combined with the melamine and then the resulting mixture is subjected to heating which will insure that the flame retardant when incorporated into a synthetic resin will not cause significant foaming when the synthetic resin is subjected to molding conditions, but will impart flame resistance to said synthetic resin. Another alternative involves combining the phosphoric acid and polyol, then adding the urea and heating the mixture until substantially all the esterification has taken place to yield a solid esterification product, then the melamine is combined with the esterification product and the admixture is subjected to degassing, as in the previously described method. Generally, when this method or the immediately previously described method is employed for preparing the inventive flame retardant, the weight ratio of the esterification product to melamine is in the range of about 10:1 to about 1:2 or, preferably, in the range of about 6:1 to about 1:2.

In preparing the inventive flame retardant from urea, phosphoric acid, polyol, and melamine the temperatures found satisfactory for degassing the retardant are generally in the range of about 190° C. The time required for degassing is generally in the range of from about 0.5 to about 4 hours. The esterification generally requires heating for several hours at a temperature of at least about 100° C.

The flame-retardant additive of this invention prepared from phosphoric acid, urea, polyol, and melamine can be employed in a synthetic resin to impart flame resistance thereto. The amount of such flame-retardant additive necessary can vary widely depending upon the resin, the additive components, and the desired amount of flame retardance. In general about 20 to about 60 parts by weight of the flame retardant is employed for every 100 parts by weight of the synthetic resin or, more preferably, about 30 to about 50 parts by weight of flame retardant is employed for every 100 parts by weight of synthetic resin.

Still another method of preparing the instant inventive flame retardant involves esterifying a condensed phosphoric acid, such as polyphosphoric acid, with at least one polyol selected from pentaerythritol, dipentaerythritol, and tripentaerythritol, then reacting the esterification product with melamine and degassing, or alternatively esterifying with polyphosphoric acid at least one of pentaerythritol, dipentaerythritol, and tripentaerythritol in the presence of melamine and degassing the product.

The esterification generally requires heating the condensed phosphoric acid and the polyol for several hours at a temperature of at least about 120° C. After all the melamine has been added the reaction mixture is heated under such conditions that sufficient foaming occurs to insure that when the flame retardant is incorporated into a synthetic resin it will not cause significant foaming when the synthetic resin composition is subjected to molding conditions, but will impart flame resistance to the synthetic resin composition when it is subjected to combustion conditions. As more volatiles are driven off in the preparation of the flame-retardant additive, the less tendency there will be for a plastic material containing the flame retardant to foam during molding. As higher temperatures and longer heating periods are employed in the preparation of the flame-retardant additive, I have observed that darker colored products are obtained. It is sometimes undesirable to include such darker colored products in polymer compositions. By mere routine experimentation one skilled in the art can determine for a particular application the heating conditions that will provide a flame retardant of this invention which has the best balance of color and diminished tendency toward void formation. Generally the reaction product is devolatilized at a temperature in the range of from about 100 –300° C for a time sufficient to drive off a suitable amount of volatile matter; generally the heating time is from about 1 to about 25 hours. A more preferred range for the devolatilization is a temperature of about 190° to about 280° C for about 2.5 to about 6 hours.

When part of the melamine is present in the reaction mixture when the condensed phosphoric acid is esterified with the polyol, some degassing is believed to occur concurrently with the esterification.

As stated before, any proportions of reactants can be employed in this invention which after being degassed will in an effective amount impart flame-retardant properties to a synthetic polymer, e.g., polyolefin. Generally in the method employing condensed phosphoric acid the flame retardant is prepared by reacting about 2.5 to about 6 parts by weight of condensed phosphoric acid, about 1 to about 3 parts by weight of polyol selected from at least one of pentaerythritol, dipentaerythritol, or tripentaerythritol, and about 2 to about 4 parts by weight of melamine. More preferably, the fourth flame-retardant composition is prepared from about 3 to about 5 parts by weight of condensed phosphoric acid, about 1.1 to about 2.5 parts by weight of said polyol, and about 2.5 to about 3.5 parts by weight of melamine.

Instead of employing commercially available polyphosphoric acid the condensed phosphoric acid can be prepared from phosphoric acid and $P_2O_5$ as is known in the art. When this technique is employed, the weight ratio of $H_3PO_4:P_2O_5$:polyol:melamine is generally in the range of 1–1.5:6–8.5:2–8:5–10.

In a preferred method of preparing the flame-retardant additive from a condensed phosphoric acid up to about 20 weight percent of the melamine is added to the condensed phosphoric acid along with the polyol employed in the esterification. Generally about 5 to about 20 weight percent of the melamine is employed in this manner. This results in a lighter colored product.

All the melamine can be added along with the polyol, but a the temperature increases the mixture tends to ball up and become lumpy and therefore difficult to handle. However, the product so produced is effective as a flame retardant.

The flame retardant prepared from condensed phosphoric acid can be employed in an effective amount to provide flame resistance to a synthetic resin. Of course, it must be recognized that different type resins can require different loadings of flame retardant to get similar flame-retardancy effects.

Generally about 20 to about 60 parts by weight of the flame retardant for every 100 parts by weight of synthetic resin is sufficient to impart satisfactory flame resistance. More preferably, the loading is from about 30 to about 50 parts by weight of flame retardant for every 100 parts by weight of synthetic resin.

In Table I there are given several methods in which phosphoruscontaining systems are prepared and added to polypropylene, namely Embodiments I, II, III and IV. There are two subembodiments under the heading of Embodiment I.

The thermal degassing of the phosphorus-containing additive of the instant invention can be carried out on a blend of compounds as described in Embodiment II or the thermal degassing can be a step in a synthetic procedure as practiced in Embodiments III and IV. The phosphorus-containing flame retardant additives which are thermally degassed according to the present invention generally correspond to one or more of the compositions described in Embodiments II, III and IV of Table the additive system has not been a priori degased, that molding must be carried out an an impractically low temperature of about 350°–400° F if the problem is to be minimized. This can cause other problems.

The increase in suitable molding temperatures in Embodiment II over Embodiment I illustrates that Embodiment II yields nonburning, nondripping polypropylene formulations which possess significantly less tendency to foam. Therefore, these formulations can be molded at correspondingly higher temperatures. Foaming during the molding operation is usually undesirable because voids which are produced in the final molded objects are generally undesirable. The higher molding temperatures of Embodiments III and IV illustrate that these systems yield polypropylene samples with less tendency to foam during molding. In general, molding temperatures of approximately 450°–500° F are considered desirable or necessary.

Table I

Phosphorus-Containing Flame Retardant Additives
Suitable Molding Temperatures (SMT)

| | Embodiment I* | Embodiment II* | Embodiment III* | Embodiment IV** |
|---|---|---|---|---|
| (i) | ammonium polyphosphate (AP) dipentaerythritol (DPE) | Same additives as Embodiment I; thermal degassing of additives prior in formulation in polypropylene distinguishes Embodiment II over Embodiment I | Reaction product of $H_3PO_4$, urea, dipentaerythritol, and melamine | Reaction product of $H_3PO_4$, $P_2O_5$, dipentaerythritol, and melamine |
| (ii) | melamine pyrophosphate (MP) and at least one of pentaerythritol (PE), dipentaerythritol (DPE), and tripentaerythritol (TPE) | | | |
| | SMT 350–400° F | SMT 350–450° F | SMT 350–475° F | SMT 350–475° F |

*In Embodiment (I), as disclosed in application Serial No. 382,169, it is advantageous to coat the ammonium polyphosphate with about 1–3 weight percent stearylamine prior to compounding in polypropylene; this procedure alleviates an incompatibility problem in the polypropylene. The use of uncoated ammonium polyphosphate results in "blooming" in the molded polypropylene which exhibits a tacky surface with a dull appearance. No incompatibility problem was encountered in Embodiments I (ii), II, III and IV. See footnote 3, Table II.

*The additives are heated at 175 to 275° C for 0.5 to 4 hours to cause a foaming reaction. After this thermal degassing, the residue is used to formulate a nonburning, nondripping polypropylene.

*The reaction product is heated at 190–260° C for 0.5 to 4 hours before formulating in polypropylene (integral partof additive synthesis procedure).

*The reaction product is heated to 190–280° C for 0.5 to 6 hours before formulating in polypropylene (integral part of additive synthesis procedure).

*Pentaerythritol or tripentaerythritol can be used in place of dipentaerythritol in Embodiment IV.

I.

Embodiment I primarily shows the flame-retardant effectiveness of a phosphorus-containing additive system which has not been degassed, according to the invention. Foaming, i.e., void formation, is such a severe problem in the practice of Embodiment I in which A. Embodiment I The additives shown in Table I under Embodiment I (i) and I (ii) were blended in polypropylene on a three-inch roll mill for 5 minutes at 320°–350° F. Samples for testing were cut from sheets of the formulation that had been molded at 350° F in picture frame molds. Results are summarized in Table II.

Table II

Evaluation Data on Flame Retardant
Polypropylene Samples (Embodiment I of Table I)*

| Run No. | Additive(php)* | Burning Test Results | | UL 94* | Ratio AP/DPE |
|---|---|---|---|---|---|
| | | ASTM D635* | ASTM D2863* | | |
| Control | None | B | Ca. 18 | | |
| 1. | AP (30) DPE (6) | SE | N.D. | Not SE-O | 5:1 |
| 2. | AP (40) DPE (8) | SE | N.D. | Not SE-O | 5:1 |
| 3. | AP (40) DPE (12) | SE-NE | 28.7 | SE-O | 3.33:1 |
| 4. | AP (40) DPE (16) | NB | 29.5 | SE-O | 2.5:1 |
| 5. | AP (30) DPE (16) | NB | N.D. | SE-O | 1.87:1 |
| 6. | AP (20) DPE (20) | NB | N.D. | SE-O | 1:1 |
| 7. | AP (40) DPE (16) Asbestos (10) | SE | N.D. | SE-O | 2.5:1 |
| 8. | AP (40) | NB-SE | N.D. | SE-O | 2.5:1 |

Table II-continued

Evaluation Data on Flame Retardant Polypropylene Samples (Embodiment I of Table I)[f]

| Run No. | Additive(php)[a] | Burning Test Results ASTM D635[b] | ASTM D2863[c] | UL 94[d] | Ratio AP/DPE |
|---|---|---|---|---|---|
| 9. | DPE (16) Glass Fiber (10) MP (30) DPE (16) | NB-SE | 31 | SE-O | 1.87:1 |

[a]AP, MP, and DPE represent respectively, ammonium polyphosphate, melamine pyrophosphate and dipentaerythritol.
[b]B, SE and NB represent, respectively, burning, self-extinguishing and nonburning.
[c]N.D. represents not determined. The numbers represent "oxygen index" as defined in ASTM D2863. These numbers are defined as "limiting oxygen index" in Fenimore and Martin, Mod. Plastics, Nov. 1966, page 141.
[d]UL-94 refers to an Underwriters Laboratory test method described in Mod. Plastics, Oct. 1970, page 96. In accordance with this test, the SE-O rating indicates that a vertically positioned molded specimen contacted for 10 seconds with a flame extinguishes within 5 seconds after removal of the flame on two successive flame applications and doesn't drip flaming particles capable of igniting a cotton ball positioned 12 inches below the molded specimen. Molded specimen sample slabs were 5' × ⅛" × ⅛".
[f]Formulations containing ammonium polyphosphate coated with 1 to 3 weight percent stearylamine exhibited no incompatibility in molded polypropylene (see footnote b in Table I). The stearylamine in chloroform was contacted with ammonium polyphosphate. Removal of chloroform solvent on a rotary evaporator gave the coated ammonium polyphosphate suitable for use in Embodiment 1 (i).

The results of runs 1–9 demonstrate the flame retardant effectiveness of Embodiment I. (Note Se-O ratings on US 94 test for runs 3–9.)

The amount and nature of the additives of Embodiments I and II generally suitable for use in polypropylene are in the following approximate ranges.

| Additive | Broad (php) | Preferred (php) |
|---|---|---|
| Ammonium Polyphosphate (AP) or Melamine Pyrophosphate (MP) | 10–70 | 20–40 |
| Dipentaerythritol (DPE) | 5–30 | 10–20 |
| Fillers such as glass fiber, TiO₂ or asbestos | 0–15 | 1–10 |
| Weight Ratio AP/DPE or | 14:1 to 0.25:1 | 4:1 to 1:1 |
| Weight Ratio MP/DPE | 0.25:1 | |
| Total Loading of Components | 30–90 | 40–60 |
| Weight Percent Stearylamine based on ammonium polyphosphate for coating | 0.5 to 5 | 1 to 3 |

Range for the formulations given herein in each embodiment can be determined by routine experimentation and those given are now preferred. (B) Embodiment II The operability of Embodiment II in the present invention is substantiated by the thermal degassing of a melamine pyrophosphate/dipentaerythritol blend. The thermal degassing can be carried out at about 175°–275° C until a foaming reaction has substantially subsided. The resulting residue can be formulated with polypropylene and molded at 350°–450° F without foaming. The molded samples are nonburning and nondripping. The procedure of Example I is a representative thermal degassing treatment.

EXAMPLE I

An 8g sample of melamine pyrophosphate was mixed with 4g dipentaerythritol and the mixture was pulverized. The resulting powder was placed in a 200 ml round bottomed flask equipped with stirrer and nitrogen inlet tube. The mixture of reactants was degassed by heating the flask in an oil bath up to a temperature of 260° C over a 1.75 hours time interval. The resulting light tan solid was ground to a powder and used as a flame retardant in polypropylene (See Runs 10 and 11 in Table III. In Run 12 a different ratio of MP/DPE was used.).

Table III

Evaluation Data on Flame Retardant Polypropylene Samples Based on Degassed MP/DPE Additive (Embodiment II)

| Run No. | Level of Additive(php) | (MP/DPE)Wt.Ratio[a] | ASTM D635-63 | Observations on Molded Polypropylene Samples |
|---|---|---|---|---|
| 10 | 45 | 2:1 | NB-SE | Good char; nondripping; foams a little at 475° F in 5 minutes |
| 11 | 45 | 2:1 | SE | No foam at 425° F; nondripping |
| 12 | 45 | 1.67:1 | NB | Stable at 475° F for 5 minutes (no foam); nondripping |

[a]Prior to thermal degassing treatment of MP/DPE blend.

The results in Table III indicate that in Embodiment II suitable molding temperatures (SMT) in the range of 450° F (350°–450° F) which are desirable can be used. The thermal degassing procedure of Embodiment II thus significantly reduces the tendency of formulated polypropylene to foam during molding. The samples of Embodiment I were molded at approximately 350° F to avoid the foaming problem. Higher temperatures would not have been possible without undue foaming.

The tendency of formulations to foam was studied by examining molded samples which had been maintained at elevated temperature for a specified time. Such samples were broken and visually examined in cross-section for the presence of voids due to foaming.

As noted above, the operating ranges for Embodiment I are also applicable to Embodiment II.

Thermal degassing of the ammonium polyphosphate/dipentaerythritol system can be practiced by heating as herein described.

C. Embodiment III

The operability of Embodiment II in the present invention is demonstrated by the thermal degassing of the reaction product derived from $H_3PO_4$, urea, dipentaerythritol, and melamine. Preferably, in practice, the product from the reaction of $H_3PO_4$, urea, dipentaerythritol is isolated as a white solid which is subsequently heated at an elevated temperature with melamine to complete the preparation and degassing of the flame retardant additive as described in Example II and the evaluation data on molded flame retardant polypropylene samples are given in Table IV. Alternatively, $H_3PO_4$, urea, dipentaerythritol, and melamine can be reacted simultaneously.

Generally, the molar ratio of $H_3PO_4$:area:dipentaerythritol will be in the approximate range 3-10:6-.5-20.5:0.4-3.0. 3.0.

EXAMPLE II

A 90 g (1.5 moles) sample of urea was placed in a 500 ml threenecked flask equipped with a stirrer, reflux condenser and addition funnel. After the slow addition of 86.5 g of 85 percent phosphoric acid (0.75 mole $H_3PO_4$), the mixture was warmed to give a solution. Water (20 ml) was added to this solution followed by the addition of 28 g (0.11 mole) of dipentaerythritol. The stirred reaction mixture was heated for 20 hours at approximately 90° C and then the temperature was gradually increased to about 130° C and maintained at 130° C for 2 hours. The reaction mixture foamed as the temperature was increased to 130° C. The reaction mixture was cooled to room temperature and filtered to remove a white solid which was washed with 50 ml cold water and air-dried to give 72.6 g of product (m.p. 186° C dec.). This product was divided into portions each of which was treated with melamine and degassed in an oven for a period of approximately 2 hours as follows:

a. (Weight ratio of Example II product to melamine = 6.1)

A 10 g sample of Example II was pulverized with 1.64 g melamine and heated at 220° C (weight loss 3.25 g 28 percent)

b. (Weight ratio of Example II product to melamine = 3.05)

A 10 g sample of Example II product was pulverized with 3.28 g melamine and heated at 220° C (weight loss 3.34 g, 25 percent)

c. (Weight ratio of Example II product to melamine = 2.03)

A 10 g sample of Example II product was pulverized with 4.92 g melamine and heated at 220° C (weight loss 3.4 g, 22 percent)

d. (Weight ratio of Example II product to melamine = 2.04)

A 20 g sample of Example II product was pulverized with 9.8g melamine and heated at 220° C (wt. loss 6.9g, 23%).

The above additives (a) – (d) were used as flame retardants in propropylene and the evaluation data are given in Table IV. See Runs 13–16.

Table IV

Evaluation Data on Nonburning Nondripping Polypropylene Samples Based on Degassed Product from the Reaction of Phosphoric Acid, Urea, Dipentaerythritol, and Melamine (Embodiment III)

| Run No. | Additive Level (php) | ASTM D2863-70 Oxygen Index | ASTM D635-63 | UL-94[b] Test | Observations on Molded Polypropylene Samples |
|---|---|---|---|---|---|
| 13 | 45 | 29.8[a] | NB | 4 | Nonburning and Nondripping with Excellent Char |
| 14 | 45 | 27.7 | NB | 5 | " |
| 15 | 45 | 28.7 | NB | 7 | " |
| 16 | 45 | Not Determined | NB | 7 | Nonburning and Nondripping with Excellent Char Does not foam at 475° F in 5 minutes |

[a]The limiting oxygen index of polypropylene containing no flame retardant is about 18.5.
[b]Sample slabs were 5" × ⅛" × ⅛". The numbers 4, 5 and 7 indicate the number of ignitions which were self-extinguished within 5 seconds after removing the flame from the test sample. The materials of Table IV are classified as SE-O (see footnote d of Table I).

The data of Table IV (see especially Run 16) demonstrate that the nonburning nondripping polypropylene made in accordance with Embodiment III can be molded without foaming over the temperature range of 350°–475° F.

In the practice of Embodiment III, $H_3PO_4$, urea, dipentaerythritol, can be reacted in an approximate molar ratio of 7.5:15:1 to give a white solid (m.p. 186° C. dec.). On heating this white solid (Q) with melamine at 220° C the inventive flame retardant of Embodiment III is produced. Temperatures in the range of 190° to 280° C are suitable for this heat treatment. Weight ratios of (Q) to melamine can vary over the range of 10:1 to 1:2 with a preferred range of 6:1 to 2:1. (D) Embodiment IV The operability of Embodiment IV in the present invention is demonstrated by the thermal degassing of the reaction product derived from $H_3PO_4$, $P_2O_5$, dipentaerythritol, and melamine. Examples III and IV describe the preparation and thermal degassing of the additive. Evaluation data on molded flame retardant polypropylene samples are given in Table V. Pentaerythritol replaces dipentaerythritol in Example V.

The following Example III employs in its preparative method a procedure somewhat different from others which have been set forth. Thus, $P_2O_5$ and $H_3PO_4$ are brought together and dipentaerythritol then added to the admixture which is heated for a time following which melamine is added with additional heating and further melamine and further heating.

Generally, molar ratios in this embodiment will be in the following approximate ranges: $H_3PO_4$:$P_2O_5$:pentaerythritol:melamine 0.5–1.5:2–3:1–2:2–4; $H_3PO_4$:$P_2O_5$:dipentaerythritol:melamine 0.5–1.5:2–3:0.5–1.5-

:2–4; and $H_3PO_4:P_2O_5$:-tripentaerythritol:melamine 0.5–1.5:2–3:0.3–1.0:2–4.

EXAMPLE III

A 34g (0.24 mole) sample of phosphorus pentoxide was placed in a 200 ml three-necked round bottomed flask fitted with a stirrer, addition funnel and reflux condenser. The dropwise addition of 0.1 mole (11.6g of 85% $H_3PO_4$) phosphoric acid to the phosphorus pentoxide was followed by the addition of 25.4g (0.1 mole) of dipentaerythritol. The mixture was stirred for 30 minutes at room temperature and then heated to a mobile mass by means of a hot oil bath. Heating was continued at 110° C for four hours and the reaction mixture became light brown. A total of 20g (0.16 mole) melamine was added in 5g (0.04 mole) portions and the reaction mixture became very thick. The mixture was cooled to room temperature and stored overnight. The reaction mass was heated to 120° C and an additional 27g (0.216 mole) of melamine was added as the temperature was slowly increased to 160° C. Heating at 160° C was cntinued for one hour after all the melamine had been added. The semisolid reaction product was removed from the flask and allowed to solidify before grinding to a powder (109g).

A 10g sample of the above product was heated for one hour in an oven at 230°–235° C. During this heat treatment, the sample lost 0.5g in weight and darkened in color. A 9.0g sample of this material was blended with 20g of polypropylene and molded into bars for flammability tests reported in Table V (See Run 17).

EXAMPLE IV

This procedure was the same as used in Example III except for the addition of 5g (0.04 mole) melamine before heating the mixture to about 110° C. This mixture was heated in an oil bath at 110°–120° C for 5 hours and then 15g (0.12 mole) melamine was added slowly in 5g portions. After standing overnight at room temperature, the mixture was heated to 130° C and the remaining 17.2g (37.2g total, 0.27 mole) melamine was added in small portions as the temperature was slowly increased to 165° C over a 3 hour period. The resulting cream colored mass was heated at 165° C for an additional 1.5 hours after all the melamine had been added. On cooling to room temperature the reaction mixture solidified and was ground to a fine powder which weighed 105.8g.

A 10g sample of the above product was heated for one hour in an oven at 230°–240° C. During this heat treatment, the sample lost 0.5g in weight. A 9.0g sample of this material was blended with 20g of polypropylene and molded into bars for flammability tests reported in Table V (See Run 18).

In the practice of Embodiment IV, $H_3PO_4$, $P_2O_5$, and dipentaerythritol are reacted in an approximate molar ratio of 1:2.5:1. The preparation of the inventive flame retardant is completed by the addition of melamine and additional heating as described in Examples III and IV. The additive is subjected to a final heat treatment in the suitable temperature range of 165°–280° C with a preferred temperature range of 220°–250° C.

In the practice of Embodiment IV, pentaerythritol can be substituted for dipentaerythritol as demonstrated in Example V. It is to be noted in Example V that $H_3PO_4$, $P_2O_5$ and pentaerythritol are reacted in an approximate molar ratio of 1:2.5:1.5.

EXAMPLE V

A 47g (0.33 mole) sample of phosphorus pentoxide was placed in a 400 ml beaker equipped with a stirrer and nitrogen inlet tube to maintain an inert atmosphere during the preparative procedure. The dropwise addition of 0.133 mole (15.3g of 85% $H_3PO_4$) phosphoric acid required 15 minutes and was followed by the addition of 27.2g (0.2 mole) of pentaerythritol. The reaction mixture was stirred and heated to about 120° C before the addition of 5g (0.04 mole) melamine. Heating was continued with stirring for approximately 5 hours and the temperature varied between 120° and 124° C. An additional 15g (0.12 mole) melamine was blended into the hot mixture before heating was stopped. At this point the reaction mixture possessed an off-white color.

The reaction mass was heated to 175° C and an additional 30g (0.24 mole) melamine was added and the temperature was increased to 230° C for a period of two hours. The solid was removed from the beaker and pulverized to give 136g of off-white powder.

A 25g sample of the above product was heated for 2 hours in an oven at 240° to 250° C. During this heat treatment, the sample lost 2.3g in weight and turned from an off-white color to a light tan color being darker on top. This material was ground to a tan powder before being formulated in polypropylene. Results of the flammability tests are given in Table VI.

Table VI[a]

| ASTM[b] D635-63 | ASTM[c] D2863-70 Oxygen Index | Observations on Molded Polypropylene Sample |
|---|---|---|
| NB | 30.3 | Nondripping excellent char; foams just a very little at |

Evaluation Data on Nonburning Nondripping Polypropylene Sample Based on Degassed Product from the Reaction of Pentaerythritol, $H_3PO_4$, $P_2O_5$ and Melamine (Embodiment IV)

Table V

Evaluation Data on Nonburning Nondripping Polypropylene Samples Based on Degassed Product from the Reaction of Dipentaerythritol, Phosphoric acid, $P_2O_5$ and Melamine (Embodiment IV)

| Run No. | Additive Level (php) | ASTM D2863-70[a] Oxygen Index | ASTM D635-63 | Observations on Molded Polypropylene Samples |
|---|---|---|---|---|
| 17 | 45 | 27.8 | NB | Nonburning, Nondripping Excellent char, no foaming at 470° F/10 min. Does foam at 480° F/10 min. |
| 18 | 45 | 28.7 | NB | Nonburning, Nondripping Excellent char |

Table VI-continued

Evaluation Data on Nonburning Nondripping Polypropylene Sample Based on Degassed Product from the Reaction of Pentaerythritol, $H_3PO_4$, $P_2O_5$ and Melamine (Embodiment IV)

| ASTM[a] D635-63 | ASTM[c] D2863-70 Oxygen Index | Observations on Molded Polypropylene Sample |
|---|---|---|
| | | 480° F/10 min. |

[a]Additive level was 45 php (i.e., 45 parts of additive per 100 parts of polymer).
[b]NB represents nonburning.
[c]See footnote a of Table V.

It is to be noted in Example V of Embodiment IV that $H_3PO_4$, $P_2O_5$, and pentaerythritol are reacted in an approximate molar ratio of 1:2.5:1.5. In the practice of Embodiment IV, see Example IV, $H_3PO_4$, $P_2O_5$ and dipentaerythritol were reacted in an approximate molar ratio of 1:2.5:1.

The procedure described in Example VI below is representative of Embodiment IV for the preparation of phosphate additives which can be base treated before being thermally degassed for use in the present invention.

EXAMPLE VI

A 34g (0.24 mole) sample of phosphorus pentoxide was placed in a 200 ml three-necked flask equipped with a stirrer, addition funnel and reflux condenser fitted with a nitrogen inlet tube. After the dropwise addition of 11.8g of 85% phosphoric acid (0.1 mole $H_3PO_4$), 25.4g (0.1 mole) dipentaerythritol and 5g (0.04 mole) melamine were added to the reaction mixture. The stirred mixture was maintained in the temperature range of 120°–130° C for a period of five hours. Heating was stopped and an additional 15g (0.12 mole) melamine was added in portions to the reaction mixture which was stored overnight at room temperature.

The reaction mixture was heated to 130° C and the final 20g (0.16 mole) melamine was added in portions over a period of one hour. During this addition the temperature was increased to about 155° C and the reaction mass was maintained at about 160° C for two hours. The temperature of the reaction mixture was increased to 240° C over a one hour period and finally maintained at 240°–265° C for 1.5 hours. During the final heating period, the reaction mixture became a tan-creamy mass and foamed. On cooling to room temperature, the reaction mixture solidified. This product was pulverized to give a powder which weighed 106g and melted at 264°–273° C with decomposition. It is to be noted that the molar ratio of dipentaerythritol-phosphoric acid:phosphorus pentoxide:melamine in this example was 1:1:2.4:3.2.

Twenty gram samples of the additive prepared above were slurried in 50 ml distilled water and treated with 5% aqueous NaOH as summarized below. The water was removed in vacuo, the residue dried at 140° C, and then thermally degassed at 242° C for two hours.

Table VII

Thermal Behavior of Phosphate Flame Retardants Isolated from Aqueous Slurries of Varying pH

| Sample No. | ml 5% NaOH Added | Approximate pH Before | Approximate pH After | Wt. Loss (g) on Heating | Observations on Heating Phosphate Flame Retardants |
|---|---|---|---|---|---|
| 1 | 20 | 2 | 4 | 2.3 | foamed some, darkened slightly |
| 2 | 30 | 2 | 5 | 2.6 | foamed some, darkened slightly |
| 3 | 40 | 2 | 6 | 3.0 | no foaming, darkened slightly to brown |
| 4 | 50 | 2 | 7 | 1.9 | no foaming, darkened slightly to tan-brown |
| 5 | 0 | Not Treated | Not Treated | 1.4 | foamed, dark on top |

Samples of the above NaOH treated additives were evaluated in polypropylene. The phosphate additives were blended in polypropylene on a three-inch roll mill at 320°–350° F for five minutes. Specimens (5 × ½ × ⅛ inches) for use in the flame retardant tests were cut from sheets of the formulation that had been molded at 400°–450° F. Results of these tests are shown in Table VIII.

Table VIII

Evaluation of Flame Retardant Polypropylene Samples (45 phr)[a] Containing Phosphate Flame Retardants Isolated from Aqueous Slurries of Varying pH (Embodiment IV)

| Sample No. | Approximate pH of Additive/Water Slurry | ASTM D2863-70 Oxygen Index | ASTM D635-63[b] | Observations[c] |
|---|---|---|---|---|
| 1 | 4 | 29.1 | NB | Nondripping, excellent char, foamed just a little at 480° F/10 min. |
| 2 | 5 | 29.5 | NB | Same as 1 |
| 3 | 6 | 26.9 | SE | Nondripping, good char, no foam at 480° F/10 min. |
| 4 | 7 | 20.6 | B | Fairly good char but burning hunks fell off in ASTM D635-63 test, no foam at 480° F/10 min. |
| 5 (Control) | 2 | 28.4 | NB | Nondripping, excellent char, foams at 480° F/10 min. |

[a]phr represents parts of additive per 100 parts of polymer; additive level in all samples was 45 phr.
[b]Notations B, NB and SE represent, respectively, burning, nonburning and self-extinguishing.
[c]The samples were broken and visually examined in cross-section for voids (foaming).

The results in Table VIII indicate that sample 3 (aqueous slurry adjusted to a pH of about 6) did not foam at 480° F/10 min. It is to be noted that sample 4 (aqueous slurry adjusted to a pH of about 7) did not foam at 480°

F/10 min. but burned. Samples 5 (no base treatment), 1 (base treated to pH 4), and 2 (base treated to pH 5) foamed at 480° F/10 min. A pH range of 4–6 is now considered suitable to obtain the best balance of properties in regard to color, flame-retardancy and acidity necessary for charring.

EXAMPLE VII

A 3.460 kg sample of polyphosphoric acid (83-86% $P_2O_5$) was placed in a 2.5 gallons 6-AN-2 Baker Perkins Universal Mixer equipped with a 2 sigma blade stirrer, a thermocouple for recording the temperature of the mix, and a jacket containing a circulating heat-transfer fluid the temperature of which was controlled by a Sterelco unit heater model 6016. A 1.328 kg portion of pentaerythritol and 0.5 kg of melamine was added to the reactor and the stirrer was started. The stirred reaction mixture was maintained under a nitrogen atmosphere throughout the reaction period to minimize darkening of the product. The reaction mixture was heated to about 140°–160° C in about a 15-minute period and the remaining melamine was added to give a total melamine charge of 2.495 kg. Stirring and heating of the reaction mixture was continued for an additional 5.5 hours during which time the reaction mixture was heated in the range of 220°–260° C as the volatiles such as water were driven off. This devolatilization step was monitored by noting the power requirements of the stirrer. The reaction mass became much more viscous as the devolatilization proceeded and the desired state of cure was evidenced by that point in time at which it was necessary to quadruple the power to the stirrer in order to agitate the mixture. In other words, the proper level of cure (devolatilization) of the intumescent flame retardant (IFR) is evidenced by a large increase in the power required to turn the mixer blades.

The reactor and its contents were cooled to ambient temperature and the product was chipped from the reactor to give 6.720 kg of flame retardant from a total initial charge of 7.283 kg. The product was ground to a powder which passed through an 80 mesh screen.

The flame retardant was compounded in polypropylene at 30 phr and molded into test bars for oxygen index determinations. The flame retardant polypropylene sample had an UL-94 rating of V-O and an oxygen index of 29.8 with good char. The color of the sample was light tan.

What is claimed is:

1. A phosphorus-containing flame retardant for synthetic resins comprising the product which results when 1–100 parts by weight of phosphorus oxide having the formula $(P_2O_5)_{0.5-1.0}(H_2O)_{0.0-1.5}$, 1–100 parts by weight of melamine, and 1–100 parts by weight of polyol selected from at least one saturated open-chain polyol containing from 5 to 15 carbon atoms and from 4 to 8 hydroxyl groups are combined and heated under such conditions that when said product is incorporated into a synthetic resin in an amount sufficient to impart flame retardance said product will not cause significant foaming of the synthetic resin composition when said composition is subjected to molding conditions.

2. A flame retardant according to claim 1 wherein the phosphorus oxide is selected from the group consisting of phosphorus pentoxide, orthophosphoric acid, and condensed phosphoric acids.

3. A flame retardant according to claim 1 comprising the product which results when about 14 to about 0.25 parts by weight of melamine pyrophosphate is combined with each 1 part by weight of polyol selected from at least one of pentaerythritol, dipentaerythritol, and tripentaerythritol, and the mixture is then heated under such conditions that sufficient foaming occurs to insure that when the flame retardant is incorporated into a synthetic resin there will not be significant foaming when the synthetic resin is subjected to molding conditions.

4. A flame retardant according to claim 3 wherein the weight ratio of melamine pyrophosphate to polyol is in the range of about 4:1 to about 1:1.

5. A flame retardant according to claim 3 wherein the mixture of melamine pyrophosphate and polyol is heated at a temperature in the range of about 175° to about 275° C until the foaming has substantially subsided.

6. A flame retardant according to claim 5 wherein the weight ratio of melamine pyrophosphate to polyol is in the range of about 4:1 to about 1:1.

7. A flame retardant according to claim 6 wherein the polyol employed consists of dipentaerythritol.

8. A flame-retarded synthetic resin composition comprising a synthetic resin and about 30 to about 90 parts by weight of the flame retardant of claim 3 for every 100 parts by weight of the synthetic resin.

9. A flame-retarded synthetic resin composition of claim 8 wherein said synthetic resin consists essentially of a molding grade resin.

10. A flame-retarded synthetic resin composition of claim 9 wherein said synthetic resin consists essentially of a synthetic resin selected from the group consisting of polyolefin homopolymers, polyolefin copolymers, acrylonitrile-butadiene-styrene polymer, and polystyrene.

11. A flame-retarded synthetic resin composition of claim 10 wherein the synthetic resin consists essentially of polypropylene homopolymer or ethylene-propylene copolymer.

12. A flame-retarded synthetic resin of claim 11 wherein the flame retardant was produced by heating under such conditions after incorporation in the synthetic resin it will not produce significant foaming when the synthetic resin is molded at a temperature in the range of 350°–450° F.

13. A flame-retarded synthetic resin composition comprising polypropylene and about 30 to about 90 parts by weight of the flame retardant of claim 7 for every 100 parts by weight of polypropylene.

14. A flame-retarded synthetic resin composition comprising polypropylene and about 40 to about 60 parts by weight of the flame retardant of claim 7 for every 100 parts by weight of polypropylene.

15. A flame retardant according to claim 1 comprising the product that results when from about 30 to about 100 parts by weight of orthophosphoric acid, about 40 to about 125 parts by weight of urea, about 3 to about 90 parts by weight of melamine, and about 5 to about 90 parts by weight of polyol selected from at least one of pentaerythritol, dipentaerythritol, and tripentaerythritol, are simultaneously combined and then heated together under such conditions that sufficient foaming occurs to insure that after the flame retardant is incorporated into a synthetic resin there will be no significant foaming when said synthetic resin composition is subjected to molding conditions.

16. A flame-retarded synthetic resin composition comprising a molding grade synthetic resin and about 20 to about 60 parts by weight of the flame retardant of claim 15 for every 100 parts by weight of the molding grade synthetic resin.

17. A flame retardant according to claim 1 comprising the product that results when from about 30 to about 100 parts by weight of orthophosphoric acid is added to about 40 to about 125 parts by weight of urea, and to that is added about 5 to about 90 parts by weight of polyol selected from at least one of pentaerythritol, dipentaerythritol, and tripentaerythritol, then the mixture is heated until substantially all the esterification has taken place to yield an esterification product, then said esterification product is combined with melamine in such an amount that the weight ratio of said esterification product to the melamine is in the range of about 10:1 to about 1:2, and then the mixture is heated under such conditions that sufficient foaming occurs to insure that after the flame retardant is incorporated into a synthetic resin there will be no significant foaming when the synthetic resin composition is subjected to molding conditions.

18. A flame retardant according to claim 17 wherein after the addition of polyol the mixture is heated for about 20 hours at about 90° C and then at about 130° C for about 2 hours to yield said esterification product.

19. A flame retardant according to claim 18 wherein said esterification product and melamine are heated at a temperature in the range of 190° to about 280° C for about 2 hours.

20. A flame retardant according to claim 19 wherein the weight ratio of said esterification product to said melamine is in the range of from about 6:1 to about 2:1.

21. A flame-retarded synthetic resin composition comprising a molding grade synthetic resin and from about 20 to about 60 parts by weight of the flame retardant of claim 17 for every 100 parts by weight of said molding grade synthetic resin.

22. A flame-retarded synthetic resin composition according to claim 21 wherein the synthetic resin consists essentially of polyolefin.

23. A flame retardant according to claim 1 comprising the product that results when about 30 to about 100 parts by weight of orthophosphoric acid is added to about 5 to about 90 parts by weight of polyol selected from at least one of pentaerythritol, dipentaerythritol, and tripentaerythritol, and to that is added 40 to about 125 parts by weight of urea and then the admixture is heated until substantially all the esterification has taken place to yield an esterification product, then said esterification product is combined with melamine in such an amount that the weight ratio of said esterification product to the melamine is in the range of 10:1 to 1:2 and then the mixture is heated under such conditions that sufficient foaming occurs to insure that after the flame retardant is incorporated into a synthetic resin there will be no significant foaming when said synthetic resin composition is subjected to molding conditions.

24. A flame-retarded synthetic resin composition comprising molding grade synthetic resin and from about 20 to about 60 parts by weight of the flame retardant of claim 23 for every 100 parts by weight of synthetic resin.

25. A flame-retarded synthetic resin composition according to claim 24 wherein the synthetic resin consists essentially of polyolefin.

26. A flame retardant according to claim 1 comprising the product that results when a condensed phosphoric acid, melamine, and polyol selected from at least one of pentaerythritol, dipentaerythritol, and tripentaerythritol are combined in amounts that will impart flame retardancy to a synthetic resin by
1. esterifying said condensed phosphoric acid with said polyol and then adding melamine to said esterified condensed phosphoric acid; or
2. esterifying said condensed phosphoric acid with said polyol in the presence of at least part of the melamine and then adding the remaining melamine; and then heating the product by (1) or (2) to degas it in such a manner that a sufficient amount of volatiles will be evolved to insure that the resulting product when incorporated into a synthetic resin will not induce foaming in said synthetic resin when said synthetic resin is subject to molding conditions.

27. A flame retardant according to claim 26 wherein the reaction product of condensed phosphoric acid, polyol and melamine is suspended in water and the pH of the suspension is adjusted to a point between about 4 and about 6 before the final degassing of the product.

28. A flame retardant according to claim 26 wherein the weight ratio of condensed phosphoric acid:polyol:melamine is in the range of 2.5–6:1–3:2–4.

29. A flame retardant according to claim 28 wherein about 5 to about 20 weight percent of the melamine is added to the condensed phosphoric acid along with polyol employed in the esterification.

30. A flame retardant according to claim 28 wherein the condensed phosphoric acid contains from about 70 to about 100 weight percent $P_2O_5$.

31. A flame retardant according to claim 30 wherein the condensed phosphoric acid contains from about 80 to about 99 weight percent $P_2O_5$.

32. A flame-resistant synthetic resin comprising a molding grade synthetic resin and about 20 to about 60 parts by weight of a flame retardant of claim 26 for every 100 parts by weight of said molding grade synthetic resin.

33. A flame-resistant synthetic resin according to claim 32 wherein the synthetic resin consists essentially of polyolefin homopolymer, polyolefin copolymer, acrylonitrile-butadiene-styrene polymer, orpolystyrene.

34. A flame-resistant synthetic resin according to claim 32 wherein the synthetic resin consists essentially of polypropylene homopolymer or ethylene-propylene copolymer.

35. A flame retardant according to claim 26 wherein the condensed phosphoric acid is produced by reacting $P_2O_5$ and $H_3PO_4$ and the weight ratio $H_3PO_4$: $P_2O_5$:polyol:melamine is in the range of 1–1.5:6–8.5:2–8:5–10.

36. A flame retardant according to claim 35 wherein about 5 to about 20 weight percent of the melamine is added to the condensed phosphoric acid along with polyol employed in the esterification.

37. A flame-resistant synthetic resin comprising a molding grade synthetic resin and from about 20 to about 60 parts by weight of a flame retardant of claim 35 for every 100 parts by weight of said synthetic resin.

38. A flame-resistant synthetic resin according to claim 37 wherein the synthetic resin consists essentially of polyolefin homopolymer, polyolefin copolymer, acrylonitrile-butadiene-styrene polymer, or polystyrene.

39. A flame-resistant synthetic resin according to claim 37 wherein the synthetic resin consists essentially of polypropylene or ethylene-propylene copolymer.

40. A method for preparing a flame-retardant additive for synthetic resins comprising combining phosphorous oxide of the formula $(P_2O_5)_{0.5-1.0}(H_2O)_{0.0-1.5}$, melamine, and at least one saturated open-chain polyol containing from 5 to 15 carbon atoms and from 4 to 8 hydroxyl groups and heating such combination under such conditions that the resulting product when incorporated into a synthetic resin in an amount sufficient to impart flame retardance will not cause significant foaming of the synthetic resin composition when said composition is subjected to molding conditions, said phosphorous oxide, melamine, and polyol being employed in amounts that the resulting product will impart flame retardance to synthetic resins.

41. A method according to claim 40 wherein the phosphorus oxide is a condensed phosphoric acid and the condensed phosphoric acid is
  1. esterified with the polyol before melamine is added; or
  2. is esterified with the polyol in the presence of at least part of the melamine after which the remainder of the melamine is added; then the reaction product of (1) or (2) is suspended in water, and the pH of the suspension is adjusted to a point between about 4 and about 6; then said reaction product is heated under such conditions that the resulting product when incorporated into a synthetic resin in an amount sufficient to impart flame retardance will not cause significant foaming of the synthetic resin composition when said composition is subjected to molding conditions.

42. A method according to claim 40 wherein the phosphorous oxide is orthophosphoric acid and an amount of urea is combined with orthophosphoric acid, melamine, and said polyol, said amount of urea being such that the product will impart flame resistance to synthetic resin.

43. A method according to claim 42 wherein the orthophosphoric acid is combined first with urea and then polyol is added to provide a mixture which is heated until substantially all the esterification has taken place, then an effective amount of the product of said esterification is combined with an effective amount of melamine to yield a combination of orthophosphoric acid, urea, polyol and melamine.

44. A method according to claim 42 wherein the orthophosphoric acid is combined first with polyol and then urea is added to provide a mixture which is heated until substantially all the esterification has taken place, then an effective amount of the product of said esterification is combined with an effective amount of melamine to yield a combination of orthophosphoric acid, urea, polyol and melamine.

45. A phosphorous-containing flame retardant for synthetic resins comprising the reaction product of phosphorus oxide of the formula $(P_2O_5)_{0.5-1.0}(H_2O)_{0.0-1.5}$, melamine, and at least one saturated open-chain polyol containing from 5 to 15 carbon atoms and from 4 to 8 hydroxyl groups which has been heated under such conditions that when incorporated into a synthetic resin in an amount sufficient to impart flame retardance will not cause significant foaming of the synthetic resin composition when said composition is subjected to molding conditions, wherein said phosphorous oxide, said melamine, and said polyol are employed in amounts which when reacted and heated as described will impart flame retardance to a synthetic resin.

46. A flame-retarded synthetic resin composition comprising a molding grade synthetic resin and a sufficient amount of the flame retardant of claim 45 to render said synthetic resin flame resistant.

47. A flame-retarded synthetic resin composition comprising a molding grade synthetic resin and about 20 to about 90 php of the flame retardant of claim 45.

48. A flame-retardant according to claim 45 comprising the product which results when melamine pyrophosphate is reacted with polyol.

49. A flame-retardant according to claim 45 comprising the product which results when orthophosphoric acid, urea, melamine, and polyol are reacted.

50. A flame-retardant according to claim 45 comprising the product which results when condensed phosphoric acid, melamine, and polyol are reacted.

* * * * *